US009999209B2

(12) United States Patent
Noda et al.

(10) Patent No.: US 9,999,209 B2
(45) Date of Patent: Jun. 19, 2018

(54) TIP ROD AND FISHING ROD HAVING THE SAME (71) Applicant: Globeride, Inc., Tokyo (JP)

(72) Inventors: Takahito Noda, Tokyo (JP); Eiji Sugaya, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 36 days.

(21) Appl. No.: 14/966,434

(22) Filed: Dec. 11, 2015

(65) Prior Publication Data

US 2016/0183505 A1    Jun. 30, 2016

(30) Foreign Application Priority Data

Dec. 26, 2014  (JP) ................. 2014-265586
Sep. 25, 2015  (JP) ................. 2015-188434

(51) Int. Cl.
A01K 87/00 (2006.01)
A01K 87/02 (2006.01)
B29C 70/20 (2006.01)

(52) U.S. Cl.
CPC ............ *A01K 87/025* (2013.01); *A01K 87/00* (2013.01); *B29C 70/202* (2013.01)

(58) Field of Classification Search
CPC .... A01K 87/025; A01K 87/00; B29C 70/202; B29C 70/205; B29C 70/207; B29C 70/222; B29C 70/228
See application file for complete search history.

(56) References Cited

U.S. PATENT DOCUMENTS 2,749,643 A * 6/1956 Scott ................ A01K 87/00
                                                  138/129
3,461,593 A    8/1969 Martuch
3,953,637 A    4/1976 Phillips
(Continued)

FOREIGN PATENT DOCUMENTS

EP    0826481 A2    3/1998
EP    2 888 937     7/2015
(Continued)

OTHER PUBLICATIONS

Extended European Search Report dated May 9, 2016 for Appln. No. 15201502.0.
(Continued)

Primary Examiner — Michael H Wang
(74) Attorney, Agent, or Firm — Pillsbury Winthrop Shaw Pittman, LLP (57) ABSTRACT A tip rod made of a fiber reinforced resin has a solid structure at least at its distal end portion. The tip rod is formed by dispersing reinforcement fibers in a matrix resin, molding the matrix resin that contains the reinforcement fibers into a prescribed shape, and heating the molded matrix resin that contains the reinforcement fibers to be cured. An average diameter of the reinforcement fibers is 3 to 15 μm, an average length of the reinforcement fibers is 0.5 to 10 mm, a content of the fibers dispersed in the matrix resin is 3 to 50 wt %. The solid structure of the tip rod includes an outer layer, an intermediate layer, and an inner layer in which the reinforcement fibers are directed in a different direction for each layer. Alternatively the structure may include the outer layer and the inner layer.

13 Claims, 5 Drawing Sheets

(56) References Cited

U.S. PATENT DOCUMENTS

| | | | |
|---|---|---|---|
| 4,015,360 A | 4/1977 | Herter | |
| 4,070,127 A | 1/1978 | Loomis | |
| 4,083,140 A | 4/1978 | Van Auken | |
| 4,157,181 A * | 6/1979 | Cecka | A63B 53/10 138/130 |
| 4,178,713 A * | 12/1979 | Higuchi | A01K 87/00 428/36.1 |
| 4,468,270 A | 8/1984 | Green | |
| 4,653,216 A | 3/1987 | Inoue | |
| 4,685,241 A * | 8/1987 | Foote | A01K 87/00 156/166 |
| 4,759,147 A * | 7/1988 | Pirazzini | A01K 87/00 428/107 |
| 4,860,481 A * | 8/1989 | Christenson | A01K 87/00 156/190 |
| 4,876,143 A * | 10/1989 | Sugita | B29C 70/088 428/298.4 |
| 4,885,865 A * | 12/1989 | Rumbaugh | A01K 87/00 43/18.5 |
| 5,076,004 A | 12/1991 | Sunaga et al. | |
| 5,239,768 A | 8/1993 | Michishita | |
| 5,328,742 A * | 7/1994 | Tukihara | A01K 87/00 138/174 |
| 5,338,604 A * | 8/1994 | Yasui | A01K 87/00 428/107 |
| 5,529,731 A * | 6/1996 | Bendick | B29C 44/1209 156/173 |
| 5,686,155 A * | 11/1997 | Suzue | A01K 87/00 428/298.1 |
| 5,721,030 A * | 2/1998 | Okada | A01K 87/00 428/36.3 |
| 5,964,056 A * | 10/1999 | Grice | A01K 87/00 428/36.1 |
| 6,088,947 A | 7/2000 | Suzue | |
| 6,106,413 A | 8/2000 | Kusumoto | |
| 6,148,558 A | 11/2000 | Ono | |
| 6,286,244 B1 | 9/2001 | Weiss | |
| 6,301,821 B1 | 10/2001 | Suzue | |
| 6,524,195 B1 | 2/2003 | Kusumoto | |
| 6,601,334 B1 | 8/2003 | Ono | |
| 6,709,347 B1 | 3/2004 | Ono | |
| 7,305,792 B2 | 12/2007 | Kato | |
| 7,584,571 B2 | 9/2009 | Ryan | |
| 7,888,275 B2 | 2/2011 | Ward et al. | |
| 8,001,716 B1 | 8/2011 | Lepage | |
| 2004/0200123 A1 | 10/2004 | Whiting | |
| 2005/0178040 A1* | 8/2005 | Kato | A01K 87/00 43/18.1 R |
| 2005/0223617 A1 | 10/2005 | Morita | |
| 2006/0185218 A1 | 8/2006 | Whiting | |
| 2007/0039229 A1 | 2/2007 | Wang | |
| 2010/0189963 A1* | 7/2010 | Nair | B29C 70/202 428/195.1 |
| 2015/0150227 A1 | 6/2015 | Noda | |
| 2015/0181849 A1 | 7/2015 | Noda | |
| 2015/0181850 A1 | 7/2015 | Noda | |
| 2016/0183505 A1 | 6/2016 | Noda | |

FOREIGN PATENT DOCUMENTS

| | | |
|---|---|---|
| FR | 2892892 A1 | 5/2007 |
| GB | 1 393 102 | 5/1975 |
| GB | 2064420 | 6/1981 |
| GB | 2249006 B | 6/1994 |
| GB | 2511905 A | 9/2014 |
| JP | S54-080372 | 6/1979 |
| JP | 58-211442 | 12/1983 |
| JP | 60-212334 | 10/1985 |
| JP | 60212335 A | 10/1985 |
| JP | 06-197669 | 7/1994 |
| JP | 09-056301 | 3/1997 |
| JP | H09-248103 | 9/1997 |
| JP | 2000-93559 A | 4/2000 |
| JP | 2001037378 A | 2/2001 |
| JP | 2001-190185 A | 7/2001 |
| JP | 2001-275520 A | 10/2001 |
| JP | 2002233274 A | 8/2002 |
| JP | 2003102344 A | 4/2003 |
| JP | 3511559 B2 | 3/2004 |
| JP | 3582778 B2 | 10/2004 |
| JP | 2006034292 A | 2/2006 |
| JP | 2006-101779 A | 4/2006 |
| JP | 3884253 B2 | 2/2007 |
| JP | 2007-209301 A | 8/2007 |
| JP | 2009060916 A | 3/2009 |
| JP | 2009-207357 | 9/2009 |
| JP | 5155083 B2 | 2/2013 |
| KR | 100359183 | 10/2002 |
| KR | 20100126611 A | 12/2010 |

OTHER PUBLICATIONS

Non-Final Office Action Korean Patent Application No. 10-2015-0186205 dated Nov. 15, 2017 with English translation.
Fourth Office Action Chinese Patent Application No. 201410686908.2 dated Feb. 2, 2018 with English translation.
First Office Action Chinese Patent Application No. 201510954067.3 dated Dec. 12, 2017 with English translation.
Second Office Action Chinese Patent Application No. 201410686908.2 dated Jan. 12, 2017 with English translation.
Third Office Action Chinese Patent Application No. 201410686908.2 dated Jul. 7, 2017 with English translation.
Extended European Search Report EP Application No. 14200451.4 dated Apr. 9, 2015.
Second Office Action Chinese Patent Application No. 201410830233.4 dated Apr. 25, 2017 w/English translation.
Third Office Action Chinese Patent Application No. 201410830233.4 dated Sep. 6, 2017 w/English translation.
First Office Action Chinese Patent Application No. 201410828614.9 dated Jul. 18, 2016 w/English translation.
Office Action Japanese Patent Application No. 2013-272429 dated Sep. 29, 2016 w/English translation.
English translation JP 2003-102344.
Chinese Office Action in connection with Chinese Patent Application No. 201410828614.9 dated Feb. 13, 2017 with English translation.
Japanese Office Action dated Sep. 29, 2016 for Appln. No. 2013-272426.
Chinese Office Action dated Sep. 1, 2016 for Appln. No. 201410830233.4.
Extended European Search Report dated Apr. 10, 2015 for Appln. No. 1420034.8.
Office Action Korean Patent Application No. 10-2014-0164944 dated Jun. 8, 2017 with English language translation.
European Office Action dated Jan. 18, 2017 for Appln. No. 14195379.4.
Chinese Office Action dated Jul. 18, 2016 for Application No. 201410686908.2.
Japanese Office Action dated Oct. 13, 2016 for Application No. 2013-247568.
Extended European Search Report dated Apr. 9, 2015 for Appln. No. 14195379.4.
Office Action Korean Patent Application No. 10-2014-0185844 dated Jun. 15, 2017 with English translation.
Korean Office Action in connection with Korean Patent Application No. 10-2014-0185852 dated Jun. 12, 2017 w/English translation.
Chinese Office Action in connection with Chinese Patent Application No. 201410828614.9 dated Jun. 28, 2017 w/English translation.
Office Action Korean Patent Application No. 10-2014-0185844 dated Dec. 21, 2017 w/English translation.
Office Action Korean Patent Application No. 10-2014-0185852 dated Dec. 26, 2017 w/English translation.
Office Action Korean Patent Application No. 10-2014-0164944 dated Dec. 21, 2017 w/English translation.

* cited by examiner

TIP ROD AND FISHING ROD HAVING THE SAME

CROSS-REFERENCE TO RELATED APPLICATIONS

This application is based on and claims the benefit of priority from Japanese Patent Application Ser. Nos. 2014-265586 (filed on Dec. 26, 2014) and 2015-188434 (filed on Sep. 25, 2015), the contents of which are hereby incorporated by reference in their entirety.

TECHNICAL FIELD

The present disclosure relates to a solid type tip rod and a fishing rod having the same.

BACKGROUND

A common fishing rod has a prepreg wound around the body of the rod. The prepreg is reinforced fibers extended in a specific direction and impregnated with a synthetic resin. Such a fishing rod has a tubular structure in order to reduce the weight of the rod. However, a tip of the rod may be made solid to obtain flexibility and to prevent damage thereon when the tip portion of the rod is largely bent at the time of fish bites.

Japanese Patent Application Publication Nos. S54-80372 and H9-248103 disclose a solid tip rod made of a so-called fiber-reinforced resin material formed from a reinforced fiber that is (a carbon fiber, a glass fiber or the like) impregnated with a synthetic resin and extends from a proximal end to a distal end of the tip rod. The fiber-reinforced resin material is typically formed by pultrusion.

The above-described prior-art tip rod is formed from a material in which reinforced fibers (a continuous fiber solid body) having a length extending from the proximal end to the distal end are arranged in a longitudinal direction (an axial direction of the tip rod). Accordingly, elongation of the material is dictated by the properties of the selected reinforced fibers. For example, the elongation of the above mentioned carbon fiber and glass fiber is about 1.5% to 2.7% of the original total length, this means that the fiber itself does not stretch so much. Moreover, it is possible to enhance the rigidity against bending but the conventional tip rod has limitations on the flexibility, shear stiffness, and strength against an external torsion force. In other words, it is preferable that the tip rod have an enough flexibility so that a user of the rod can feel and see subtle fish bites as well as an enough strength against a shear rigidity or torsional force. More flexible tip rod made of the continuous fiber solid body can be obtained by reducing the outer diameter of the tip rod. However, when the rod is made too thin, assembling and processing of the rod becomes difficult. Moreover, such a rod may not have an enough strength so that it may be broken when subjected to a shear stress.

The present disclosure is intended to overcome the above problem. One object of the present disclosure is to provide a flexible tip rod that is less prone to breakage and a fishing rod having the same.

SUMMARY

A tip rod according to a first aspect of the disclosure is made of a fiber reinforced resin. The tip rod has a solid structure at least at its distal end portion. The tip rod is formed by dispersing reinforcement fibers in a matrix resin, molding the matrix resin that contains the reinforcement fibers into a prescribed shape, and heating the molded matrix resin that contains the reinforcement fibers to be cured. An average diameter of the reinforcement fibers is 3 to 15 µm, an average length of the reinforcement fibers is 0.5 to 10 mm, a content of the fibers dispersed in the matrix resin is 3 to 50 wt %. The solid structure of the tip rod includes an outer layer, an intermediate layer, and an inner layer in which the reinforcement fibers are directed in a different direction for each layer.

A tip rod according to a second aspect of the disclosure is made of a fiber reinforced resin. The tip rod has a solid structure at least at its distal end portion. The tip rod is formed by dispersing reinforcement fibers in a matrix resin, molding the matrix resin that contains the reinforcement fibers into a prescribed shape, and heating the molded matrix resin that contains the reinforcement fibers to be cured. An average diameter of the reinforcement fibers is 3 to 15 µm, an average length of the reinforcement fibers is 0.5 to 10 mm, a content of the fibers dispersed in the matrix resin is 3 to 50 wt %. The solid structure of the tip rod includes an outer layer and an inner layer in which the reinforcement fibers are directed in a different direction for each layer.

Because the tip rod according to the first and second aspects of the disclosure is made of the fiber-reinforced resin material formed by dispersing the reinforcement fibers (the average fiber diameter is 3 to 15 µm, the average fiber length is 0.5 to 10 mm) in the matrix resin material, the tip is soft and more flexible compared to the one made of a continuous fiber solid body in which reinforcement fibers having the length extending from the proximal end to the distal end are arranged along the longitudinal direction. Consequently, with the above-mentioned rod, it is possible to more easily sense and see subtle fish bites. Moreover, because the fibers are dispersed in the matrix resin, an amount of displacement allowed before breakage (fracture) is increased and such advantageous effect can be obtained even when the outer diameter is made larger for certain extent. Therefore, processing of such rod is easy. Moreover, assembling such a tip rod to a telescopic type fishing rod or a jointed type fishing rod becomes easier.

Moreover, the solid structure of the tip rod includes three layers, which are an outer layer, an intermediate layer, and an inner layer in which the reinforcement fibers are directed in a different direction for each layer. Alternatively the solid structure may include two layers, which are the outer layer and the inner layer. Since the layers include reinforcement fibers arranged in different directions for each layer, the layers all together can work against stresses in various directions. Consequently the tip rod has an enhanced strength against a shear rigidity or torsional force compared to the conventional tip rods. When a fishing line guide is attached on the tip rod, a large shear force is applied to the tip rod by an edge of a leg of the guide. Even in this case, the tip rod having the above-described structure is less prone to breakage since the shear rigidity is enhanced.

"A directional characteristic of reinforcement fibers" specified in the aspects of the disclosure means that the reinforcement fibers on the whole tend to be directed in a direction in each of the outer layer, intermediate layer, and the inner layer.

According to the aspects of the disclosure, it is possible to provide a tip rod that is softer and has a high shear rigidity and therefore is less prone to breakage. It is also possible to provide a fishing rod having such a tip rod.

DESCRIPTION OF THE PREFERRED EMBODIMENTS

Embodiments of a tip rod and a fishing rod having the tip rod according to an aspect of the present disclosure will be now described with reference to the drawings.

Figure 1:
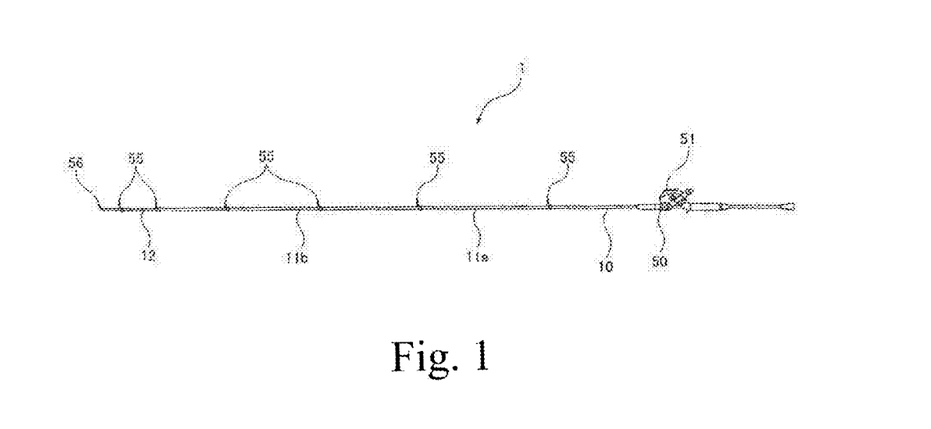
FIG. 1 is an overall view of a tip rod according to an embodiment of the disclosure.

FIG. 1 is an overall view of an exemplary fishing rod with a tip rod according to the aspect of the disclosure. A fishing rod 1 according to the embodiment is a joint-type fishing rod with external guides. The fishing rod may include a butt side rod 10, two or more intermediate rods (two intermediate rods) 11a, 11b, and a tip rod 12, and they are jointed to form a telescopic fishing rod.

The butt side rod 10 and the intermediate rods 11a, 11b may be formed as tubular bodies made of a fiber-reinforced resin material in which a synthetic resin such as an epoxy resin and a polyester resin is reinforced with a reinforcement fiber such as a carbon fiber. The fishing rod 1 illustrated in FIG. 1 may have a reel seat 50 on the butt side rod 10, external guides 55 guiding a fishing line released from a reel 51 attached on the reel seat 50, and a top guide 56 with predetermined intervals therebetween. Some of the guides may be configured to be movable and the external guides may be omitted in some embodiments. Although the telescopic fishing rod is illustrated, the fishing rods may be ordinary or inversely jointed.

Figure 2:
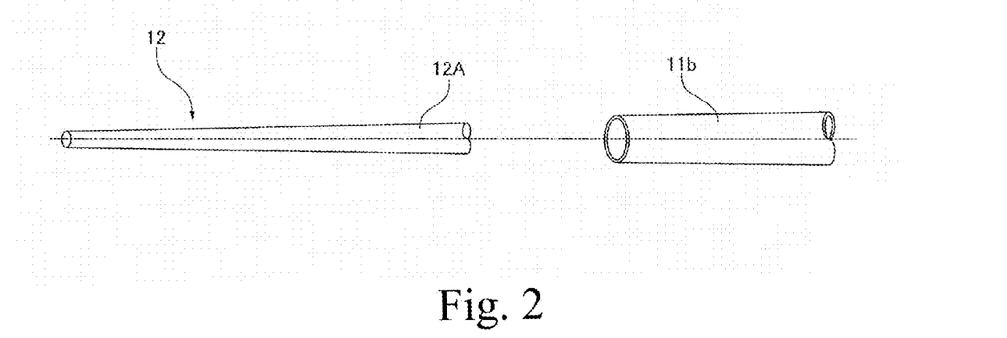
FIG. 2 is a side view showing the structure of the tip rod.

FIG. 2 illustrates the tip rod 12 among the rods shown in FIG. 1.

The tip rod 12 according to the embodiment has a solid body and a circular shape in cross-section. The tip rod 12 forms a tip portion of the fishing rod and is fitted into the intermediate road 11a. The tip rod 12 is made of a composite material in which reinforcement fibers are dispersed in a matrix resin. Therefore, the tip rod 12 has a fine flexibility and durability with which the tip is less prone to breakage (cracking).

Although the tip rod 12 shown in FIG. 2 has a solid body throughout the entire length of the tip rod extending from the proximal end to the distal end and has the circular shape in cross-section. However at least a distal end portion may be formed as the solid body and a proximal end portion may be formed as a tubular body. When at least the distal end portion of the tip rod is made as the solid body, it is possible to improve the sensitivity of a small area of the distal end portion of the tip rod.

The tip rod 12 according to a first embodiment of the disclosure will be now described in detail.

Figure 3:
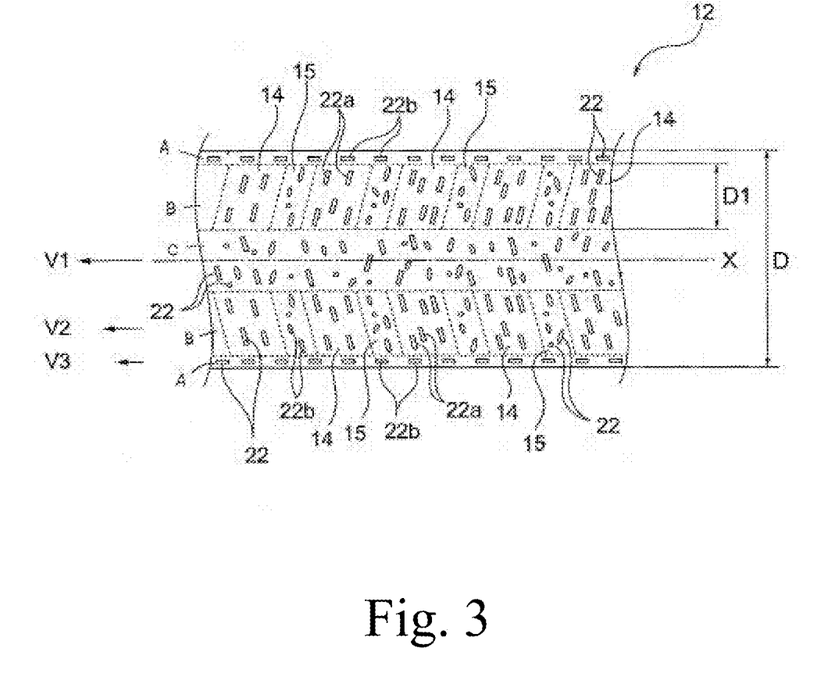
FIG. 3 is a sectional view of a portion of a solid tip rod according to a first embodiment of the disclosure along a longitudinal axial direction.

The tip rod 12 according to the first embodiment may be a solid body made of a fiber-reinforced resin material in which a number of reinforcement fibers 22 are dispersed in a matrix resin 20 as illustrated in FIG. 3. Examples of the matrix resin 20 include thermoplastic resins (for example, polyamide, polypropylene, polyphenylene sulfide, polyether imide, polycarbonate and the like) and thermosetting resins (for example, epoxy, phenol and the like). The matrix resin 20 may be formed of mainly a polyamide resin and additionally other thermoplastic resin (polyester). By selecting a resin in consideration of a wettability with fiber surfaces, it is possible to make the solid body more rigid and hard to be plastic-deformed.

The matrix resin 20 may contain other supplemental material (other than the reinforcing material). For example, the tip rod 12 can be colored by mixing a colorant such as pigment in the matrix resin, moreover the weight of the tip rod can be reduced by foaming the matrix resin to mix microbubbles therein. Moreover, it is possible to optimize molding of the fiber-reinforced resin material by adding a fluidity modifier, an anti-static agent, a mold releasing agent, an antioxidant, and the like.

The reinforcement fibers (the fibers 22) dispersed in the matrix resin 20 may be, for example, carbon fibers such as PAN carbon fibers and pitch carbon fibers or glass fibers. An average diameter of the fibers 22 may be 3 to 15 μm and an average length of the fibers 22 may be 0.5 to 10 mm.

The reason why the dimension of the fibers 22 is set in the above-describe range is that the tip rod requires a large amount of fibers to obtain a prescribed flexibility (a flexibility with a fine sensitivity) when the fiber diameter is smaller than 3 μm and the fiber length is shorter than 0.5 mm. If a large amount of fibers is mixed in the matrix resin, the fluidity at the time of molding is reduced and the fibers cannot be uniformly distributed along the longitudinal direction (axial direction) of the tip rod. Moreover, if the fiber diameter is larger than 15 μm and the fiber length is longer than 10 mm, it is difficult to mix the fibers and the fluidity at the time of molding is also reduced although it is possible to set a content ratio of the fibers for obtaining a prescribed flexibility, and consequently the fibers cannot be uniformly distributed along the longitudinal axial direction. A resultant tip rod can be easily bent and prone to breakage when it is bent locally.

The content of the above-described fiber in the matrix resin may be set to 3 to 50 wt %. This is because when the content of the fibers 22 having the above-described dimension is less than 3 wt %, a sufficient strength cannot be obtained, whereas when the content of the fibers is more than 50 wt %, the fluidity at the time of molding is reduced, and consequently the fibers cannot be uniformly distributed along the longitudinal axial direction. In this case, the resultant rod can be easily bent and prone to breakage when it is bent locally. Moreover, considering the capabilities (the softness, flexibility, and strength) for the tip rod, such capabilities would be satisfied when the content of the fibers is less than or equal to 50 wt %.

Note that all the fibers dispersed in the matrix resin may not necessarily have the above-described dimensions. The average size of the fibers may be in the above-described range and some of the fibers may be out of the above-mentioned range. In other words, it is preferable that the average value of a number of fibers be in the above-mentioned range.

The content of the fibers may not necessarily be distributed uniformly along the axial direction of the tip rod For example, when the content is increased gradually or in a stepwise fashion toward the proximal end along the axial direction, the distal end side of the tip rod can be easily bent and the rod can be made as a fast-action type. In this case, when the tip rod is made to have the same rigidity distribution as that of the tip rod with the uniform fiber distribution, the outer diameter of the front end portion has to be increased since a comparable rigidity of the distal end portion is smaller than that of the proximal end portion. In other words, the distal end portion is weighted by increasing the outer diameter thereof (the weight distribution can be adjusted). Such a tip rod has a longer vibration damping time to transmit a nibble to a user and the user can easily feel a fish bite.

Whereas when the content of the fibers is uniformly distributed along the longitudinal axial direction of the tip rod and the diameter of the rod is same along the axial direction, flexing characteristics of the bent become uniform, but by providing a taper 12A on the surface of the tip rod as the diameter of the rod decreases toward the distal end as illustrated in FIG. 2, an amount of the bend can be increased toward the distal end. Moreover, when the taper 12A is formed as illustrated in FIG. 2 on the surface of the tip rod where the content of the fibers is decreased toward the distal end, the distal end portion of the tip rod can be easily bent, resulting in an increased sensitivity. An example of a method for changing the content of the fibers along the longitudinal axial direction includes injecting fiber-reinforced resin materials with different fiber contents by using, for example, a two-color molding machine.

As for the taper, as shown in FIG. 2, the whole of the tip rod may be tapered or only a distal end portion of the tip rod can be tapered (including multistage taper). More specifically, the tip rod may be formed in a solid cylindrical shape by, for example, injection molding, and after the tip rod is demolded it is then tapered such that the diameter of the tip rod is gradually decreased toward the distal end. In this way, it is possible to obtain a tip rod with fast action and increased flexibility. To obtain a tip rod with fast action, alternatively a step portion can be formed at the middle section of the tip rod so as to decrease the diameter of the rod toward the distal end. (More than one such a step portion may be provided along the axial direction.) In this way, the rigidity is sharply (discontinuously) changed and the rod may have a different operability (usability of the rod) from ones in which the flexural characteristic smoothly change along the length of the rod. In this case, two portions sandwiching the step portion may be made straight, or a portion in front of the step region may be tapered. By processing the surface of the tip rod in this way, the ratio of the fibers that are aligned in the longitudinal axial direction can be increased in the proximal end side. The step portion may be formed from a vertical surface orthogonal to the longitudinal axial direction or a sloped surface with decreasing diameter toward the distal end (In this way, it is possible to prevent breakage due to stress concentration on a portion of the rod).

The tip rod 12 made of the above-described composite material may have a three-layered structure. The structure may include an outer layer A, an intermediate layer B, and an inner layer C and fibers 22 dispersed in each layer are aligned in a different direction from each layer. The directional characteristics of the fibers 22 in each layer will be now described. FIG. 3 schematically illustrates the state of the fibers 22 dispersed in each layer to show the directional characteristics.

Referring to FIG. 3, a directional characteristic of the fibers 22 dispersed in the outer layer A is that equal to or more than 80% of the fibers 22 are aligned along the longitudinal axial direction of the tip rod 12, which is different from the intermediate layer B and the inner layer C. Since most of the fibers 22 dispersed in the outer layer A are directed in the longitudinal axial direction (see fibers 22b), it is possible to enhance the bending rigidity of the tip rod 12 and the tip rod can be easily flexed with a prescribed elastic force.

A directional characteristic of the fibers 22 dispersed in the intermediate layer B is now described. Referring again to FIG. 3, the intermediate layer B may include a layer 14 and a layer 15 in which the fibers 22 are aligned in a different direction. The layers 14 and the layers 15 may be alternately disposed along the longitudinal axial direction. More than 80% of the fibers 22 in the layer 14 are aligned at an prescribed angle (about 40 to 60 degrees, preferably 45 degrees) with respect to a central axis X of the tip rod 12. Whereas the fibers 22 in the layer 15 are directed randomly.

The layer 14 in the intermediate layer B is slanted at a prescribed angle with respect to the central axis of the tip rod 12 so that the tip rod 12 can absorb a shear stress and enhance the shear rigidity of the tip rod. Consequently, the tip rod 12 becomes less prone to breakage. In particular, breakage of the tip rod 12 can be effectively prevented by the above-described layer 14 even when a portion of the rod where a fishing line guide is attached receives a shear stress from a leg of the guide.

The layer 15 in the intermediate layer B includes fibers 22 that are not aligned in one direction but directed randomly so that fibers 22 directed in random directions as a whole can enhance the torsional strength of the tip rod 12 together with the inner layer C which will be hereunder described in detail.

As for a thickness D1 (a thickness in the radial direction) of the intermediate layer B, when the thickness D1 is too large, balance between the strength and the flexure is deteriorated, whereas when the thickness D1 is too small, a sufficient shear rigidity cannot be obtained. Therefore it is preferable that the thickness D1 is set in a range of 20% to 80% of a diameter D. Note that the intermediate layer B may include only the layer 14.

The fibers 22 dispersed in the inner layer C are not aligned in one direction but directed randomly in the same manner as the layer 15 of the intermediate layer B. The inner layer C is situated at the center of the tip rod 12 and contributes to enhance the torsional strength of the tip rod.

Figure 4:
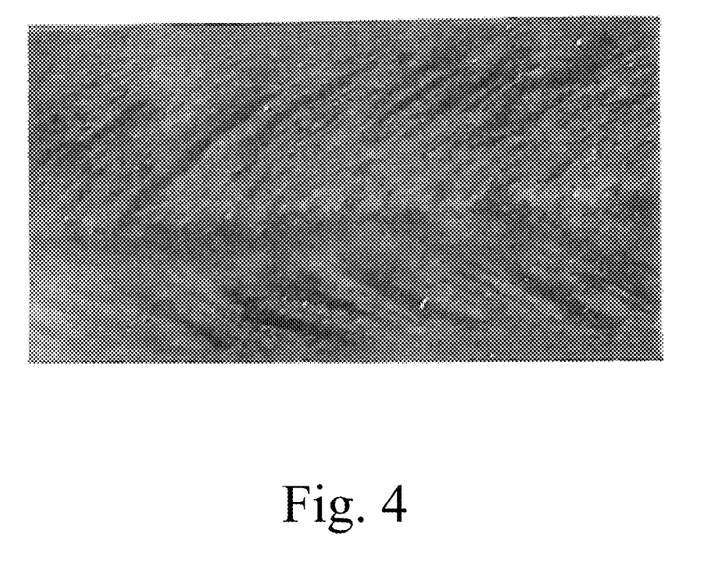
FIG. 4 is a photograph of a section of a portion of the solid tip rod according to the first embodiment of the disclosure along the longitudinal axial direction.

Although the outer layer A, the intermediate layer B (including the layers 14 and the layers 15), and the inner layer C are clearly defined with lines in the schematic drawing of FIG. 3, actual products do not have such clear boundaries of these layers. FIG. 4 is a photograph of a cross-sectional surface of an actually molded article. It can be seen from the photograph that the directional characteristics of the fibers 22 are shown as contrast and its appearance is just like a fish bone. Dark portions in the photograph are the inner layer C and the layer 15 of the intermediate layer B in which the fibers 22 are directed randomly.

According to the above-described tip rod 12, unlike the conventional tip rod in which reinforcement fibers continuously extends from the proximal end to the distal end along the longitudinal direction of the rod (continuous fiber solid body), the limitation due to the elongation of the reinforcement fibers is lifted because the fibers dispersed in the outer layer, the intermediate layer, and the inner layer have the specific directional characteristics different for each layer. Consequently it is possible to obtain a softer (largely deformable without breakage) tip rod compared to the conventional ones. With the soft tip rod 12, it is possible to improve the sensitivity of the fishing rod as a whole to sense a fish strike and enhance a visual sensitivity (a very small displacement of the tip) and an engagement characteristic (hook will not be easily released from fish). Moreover, when a tip rod is formed with the same hardness and strength, the outer diameter of the tip rod can be increased because the elasticity is low. It is possible to improve the assembling efficiency with such a tip rod with a large diameter. Furthermore, since the fibers 22 in the inner layer C are directed randomly, the tip rod has resistance against torsional deflection so that it can maintain a supposed hardness even when it is largely flexed. Note that the tip rod 12 having the above-described structure may have the distal end on the opposite side to that of FIG. 3.

A method of manufacturing the above-described tip rod will be now described. The tip rod 12 according to the aspect of the invention may be easily manufactured by, for example, extrusion molding.

A material of the tip rod 12 is a thermoplastic resin in which a number of reinforcement fibers having an average diameter of 3 to 15 μm and an average length of 0.5 to 10 mm. Pellets of the thermoplastic resin are melted by a heater while they are transported by an extrusion screw and then extruded from a discharging section in which a prescribed circular opening is provided. The pellet may have a column shape in which a number of reinforcement fibers are dispersed in a synthetic resin or a column shape in which a number of reinforcement fibers are bundled and arranged in a synthetic resin.

When an extruder is used, the pellets are provided into a hopper, the pellets are melted by a heater that heats a cylinder while the pellets are transported by a screw rotating inside the cylinder. The tip rod 12 is molded by extruding the melted pellets with a prescribed extrusion pressure from a discharging section. In this case, the columnar body extruded at the discharging section receives a small resistive force at its center and a larger resistive force at its radially outer positions at the time of extrusion. More specifically, as illustrated in FIG. 3, the center area of the columnar body receives a smaller resistive force from an edge of the opening at the time of extrusion so that the center area of the columnar body is extruded with a smallest extrusion resistance (V1, V2, and V3 indicate an easiness of extrusion in the radial direction in FIG. 3). The resistive force by the edge of the opening which a portion of the columnar body receives increases as the portion is situated more radially outer side and accordingly the extrusion resistance increases toward the radially outer side (relationships of the easiness of the extrusion may be expressed as V1>V2>V3). The synthetic resin extruded from the discharging section may be cured from it outer surface after the extrusion.

The synthetic resin after heated within the cylinder while it is transported and before extruded from the discharging section may have a state in which the reinforcement fibers are randomly dispersed. In the center area of the synthetic resin extruded from the discharging section, the fibers dispersed in the synthetic resin receives a small resistive force at the time of extrusion (the fibers remain to be directed randomly) as described above so that the reinforcement fibers tend to be dispersed randomly at the center area and consequently the inner layer C is formed as illustrated in FIG. 3.

Whereas in the radially outer area (the outer layer side) of the resin, the fibers in the synthetic resin receives a large resistive force at the time of extrusion and the resin in the outer area may be cured for a shorter time period so that the fibers are aligned along the transported direction (the longitudinal axial direction) and cured. As a result, the outer layer A is formed.

Unlike the dispersion state of the center area, the fibers in the intermediate area of the resin are aligned along the longitudinal axial direction to some extent and the resin in the intermediate area may be cured for a little longer period so that the fibers tend to be aligned at a slant with respect to the central axis. As a result, the intermediate layer B is formed.

In the above-described method, the intermediate layer B can be formed to include the layers 14, 15 that have a different characteristics from each other and are arranged alternately along the longitudinal axial direction of the tip rod 12 by adjusting an extrusion rate (including adjusting the extrusion rate intermittently), adjusting the extrusion pressure (adjusting to a stronger/weaker pressure), adjusting a temperature at which the resin is cured and the like. In other words, the fibers dispersed within the resin can be directed in a desired direction by adequately adjusting the extrusion rate, a temperature at which the resin is melted, a temperature at which the resin is cured, and other conditions. In this case, when the extrusion rate (the transport speed of the pellets) is too slow or the melting temperature is too high, the reinforcement fibers tend to be uniformly dispersed entirely in the columnar extruded body of the resin and a desired layered structure cannot be obtained. When the extrusion rate is too fast or the melting temperature is too low, the reinforcement fibers tend to be aligned along the longitudinal axial direction throughout the columnar body and a desired layered structure cannot be obtained. The alignment state of the reinforcement fibers dispersed inside the columnar resin body can also be changed by changing an extruding direction such that the resin is extruded horizontally or downwardly, changing a configuration of the discharging section (for instance, the diameter of the discharging section is increased/decreased towards the exit), and the like. In other words, the tip rod 12 having the structure according to the aspect of the disclosure can be obtained by adequately adjusting conditions such as the extrusion rate (extrusion pressure), a heating temperature (a melting state of the pellets) and the like depending on the composition of the pellets and operation environments of the extruder.

Figure 5:
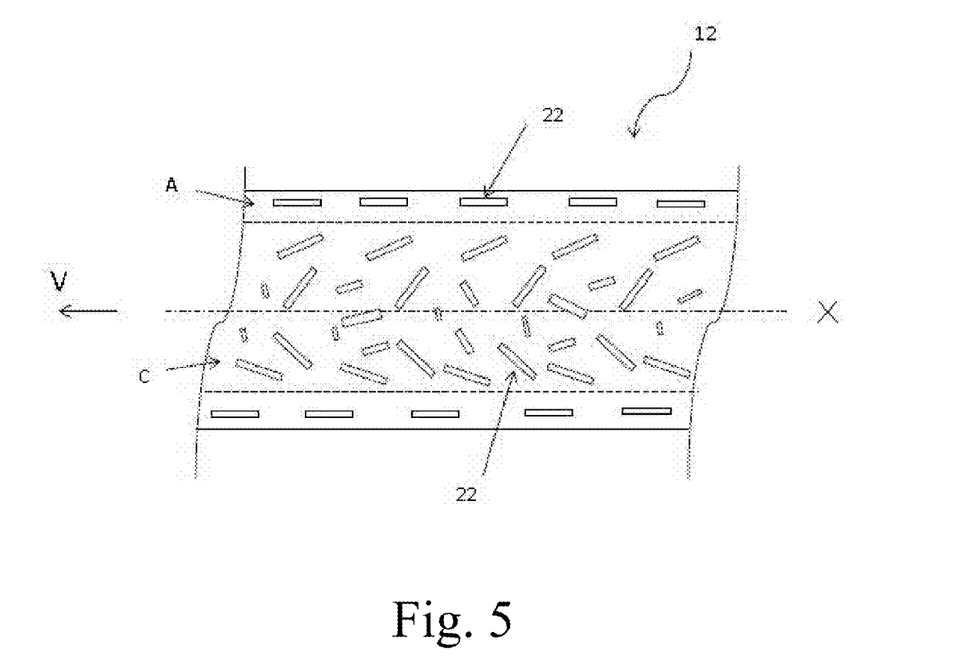
FIG. 5 is a sectional view of a portion of a solid tip rod according to a second embodiment of the disclosure along the longitudinal axial direction.

FIG. 5 is a sectional view of the tip rod 12 according to a second embodiment of the disclosure.

In the second embodiment, the tip rod may have the outer layer A same as that of the first embodiment but have the inner layer C with a different structure from the intermediate layer B and the inner layer C of the first embodiment.

Referring to FIG. 5, in the second embodiment, most of the fibers 22 dispersed in the inner layer C and situated closer to the outer layer A may be aligned at an angle with the longitudinal axial direction of the tip rod 12. The alignment of the fibers 22 in the inner layer C gradually changes such that the angle increases as they are situated closer to the center area of the rod. The fibers 22 are directed randomly in the center area. In the same manner as FIG. 3, FIG. 5 schematically illustrates the state of the fibers 22 dispersed in each layer to show its characteristics and does not show the actual dispersing state of the fibers 22.

According to the second embodiment, the fibers dispersed in the outer layer and the inner layer have a specific characteristics respectively so that the limitation due to the elongation of the reinforcement fibers is lifted in the same manner as the first embodiment. Consequently it is possible to obtain a softer (largely deformable without breakage) tip rod compared to the conventional ones.

As for a method of manufacturing the tip rod 12 of the second embodiment, the pellets are provided into a hopper, and the tip rod can be molded by extruding pellets in the direction indicated by "V" in FIG. 5. The directional characteristics of the fibers 22 dispersed in the layers can be realized by adjusting the extrusion rate, the extrusion pressure, the curing temperature of the resin and the like. A major difference from the method of manufacturing the tip rod 12 of the first embodiment is the extrusion rate. The extrusion rate used for manufacturing the tip rod of the first embodiment is changed at regular time intervals (intermittently) to form the layers 14 and the layers 15. Whereas in the second embodiment, the extrusion rate to form the tip rod is maintained at a constant value.

Although the tip rod in the above-described embodiments has a circular cross-sectional shape, the cross-sectional shape of the tip rod is not limited to this but may have a non-circular shape such as an elliptical shape, a polygonal shape, and a semicircular shape. Moreover, the tip rod may have a tubular structure in which a hollow section is provided along the axial direction. Moreover, the manufacturing method of the tip rod is not limited to the extrusion molding but the tip rod can also be manufactured by an injection molding machine or the like. When the injection molding is applied, the tip rod can be tapered without surface processing and the surface of the tip rod can be protected without exposing the reinforcement fibers.

What is claimed is:

1. A tip rod made of a fiber reinforced resin and having a solid structure at least at its distal end portion, wherein
   the tip rod is formed by dispersing reinforcement fibers in a matrix resin, molding the matrix resin that contains the reinforcement fibers into a prescribed shape, and heating the molded matrix resin that contains the reinforcement fibers to be cured, an average diameter of the reinforcement fibers is 3 to 15 μm, an average length of the reinforcement fibers is 0.5 to 10 mm, a content of the fibers dispersed in the matrix resin is 3 to 50 wt %,
   the solid structure of the tip rod includes an outer layer, an intermediate layer, and an inner layer in which the reinforcement fibers are directed in a different direction for each layer,
   wherein the intermediate layer includes two layers in which the reinforcement fibers are directed in a different direction for each layer,
   wherein equal to or more than 80% of the reinforcement fibers dispersed in one of the two layers are directed at an angle of 30 to 60 degrees with respect to a longitudinal axial direction of the tip rod,
   wherein the reinforcement fibers dispersed in other of the two layers are directed randomly, and
   wherein the two layers are arranged alternately along the longitudinal axial direction of the tip rod.

2. The tip rod of claim 1, wherein equal to or more than 80% of the reinforcement fibers dispersed in the outer layer are directed along a longitudinal axial direction of the tip rod.

3. The tip rod of claim 1, wherein equal to or more than 80% of the reinforcement fibers dispersed in the intermediate layer are directed at an angle of 30 to 60 degrees with respect to a longitudinal axial direction of the tip rod.

4. The tip rod of claim 1, wherein the reinforcement fibers dispersed in the inner layer are directed randomly.

5. A fishing rod comprising:
   the tip rod of claim 1 at its distal end.

6. The fishing rod of claim 5 wherein the fishing rod is a telescopic type, a jointed type, or an inversely jointed type.

7. A fishing rod, wherein the whole of the fishing rod has the structure of the tip rod of claim 1.

8. A tip rod made of a fiber reinforced resin and having a solid structure at least at its distal end portion, comprising:
   the tip rod is formed by dispersing reinforcement fibers in a matrix resin, molding the matrix resin that contains the reinforcement fibers into a prescribed shape, and heating the molded matrix resin that contains the reinforcement fibers to be cured, an average diameter of the reinforcement fibers is 3 to 15 μm, an average length of the reinforcement fibers is 0.5 to 10 mm, a content of the fibers dispersed in the matrix resin is 3 to 50 wt %, and
   the solid structure of the tip rod includes an outer layer and an inner layer in which the reinforcement fibers are directed in a different direction for each layer,
   wherein the reinforcement fibers dispersed in the inner layer and situated closer to the outer layer are aligned at an angle with a longitudinal axial direction of the tip rod,
   wherein the alignment of reinforcement fibers in the inner layer gradually changes such that the angle increases as they are situated closer to a center area of the tip rod, and
   wherein the reinforcement fibers in the center area are directed randomly.

9. The tip rod of claim 8, wherein 80 % of the reinforcement fibers dispersed in the outer layer are arranged along a longitudinal axial direction of the tip rod.

10. The tip rod of claim 8, wherein alignment of the reinforcement fibers dispersed in the inner layer gradually changes such that a tilt angle of the fibers increases as they are situated closer to a center area of the tip rod, and the reinforcement fibers are directed randomly in the center area.

11. A fishing rod comprising:
    the tip rod of claim 8 at its distal end.

12. The fishing rod of claim 11 wherein the fishing rod is a telescopic type, a jointed type, or an inversely jointed type.

13. A fishing rod, wherein the whole of the fishing rod has the structure of the tip rod of claim 8.

* * * * *